Figure 1:
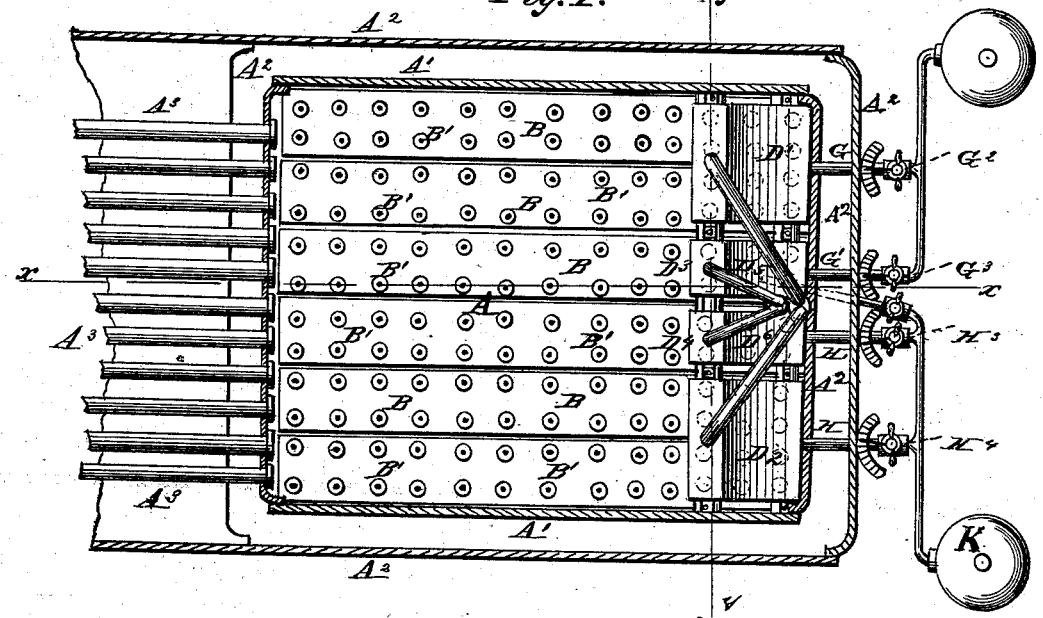

(No Model.) 4 Sheets—Sheet 1.

C. HOLLAND.
Hydrocarbon Burner.

No. 239,786. Patented April 5, 1881.

Witnesses:
P. H. Dieterich
Fred. G. Dieterich

Inventor:
Chas. Holland
per L. Lloyd Wiegand, atty (No Model.)  4 Sheets—Sheet 2.

C. HOLLAND.
Hydrocarbon Burner.

No. 239,786.  Patented April 5, 1881.

(No Model.) 4 Sheets—Sheet 3.

C. HOLLAND.
Hydrocarbon Burner.

No. 239,786. Patented April 5, 1881.

Witnesses: Inventor:
P. C. Dietrich. Chas Holland
Fred. F. Dieterich. per L. Lloyd Wigins
Atty (No Model.) 4 Sheets—Sheet 4.

C. HOLLAND.
Hydrocarbon Burner.

No. 239,786. Patented April 5, 1881.

Witnesses:
P. C. Dieterich
Fred G. Dieterich

Inventor:
Chris Holland
per Lloyd Wiegand
atty

N. PETERS, PHOTO-LITHOGRAPHER, WASHINGTON, D. C.

UNITED STATES PATENT OFFICE.

CHARLES HOLLAND, OF CHICAGO, ILLINOIS.

HYDROCARBON-BURNER.

SPECIFICATION forming part of Letters Patent No. 239,786, dated April 5, 1881.

Application filed May 22, 1880. (No model.)

*To all whom it may concern:*

Be it known that I, CHARLES HOLLAND, of the city of Chicago, in the county of Cook, in the State of Illinois, have invented a new and useful Hydrocarbon-Furnace; and I do hereby declare the following to be a sufficiently full, clear, and exact description thereof to enable others skilled in the art to make and use the said invention.

This invention is specially applicable to locomotive-engines, steam fire-engines, and engines for marine propulsion, furnaces for the treatment of ores and metals, and situations where in the application of heat sparks or ashes or other deposit of residuum from the fuel is objectionable, and also wherever lightness and compactness of fuel are desired, and is advantageous in being easily and instantly controlled and regulated, and requiring no labor in stoking or firing.

The nature of this invention may be briefly stated to consist in first passing the oil and water or steam through separate heated vessels or retorts, and raising them to a temperature of ignition, and mixing them in a pipe, from which they issue in jets through converging heated nozzles in an inclosed combustion-chamber or fire-box, in which the resultant gas burns, and in which the retort or heating-chambers are located, so as to render the operation continuous without requiring another fire or other source of heat. In conducting this process I employ an apparatus involving a number of new and useful details and new and useful combinations of previously-known details, illustrated in the drawings annexed and described in this specification, embracing, among other features, a series of separate retorts connected by tubes and secured in position in the furnace, so that all surfaces are susceptible of inspection and less liable to strains from local contraction and expansion of parts than the retorts formed of several chambers in one casting, such as are set forth in my Letters Patent No. 203,828. In case of leakage in any of the retorts so assembled and connected there is no risk of intercommunication with the other retorts.

This invention differs from that set forth in another application, bearing even date and a similar title, serially numbered 10,244 in the United States Patent Office, in passing the hydrocarbon fluid into a retort before mingling, mixing, or combining water therewith, while in the application referred to the hydrocarbon fluid is mixed with water or steam before entering the retort.

I will now proceed to describe more particularly and exactly the mode of conducting this process, and describe an apparatus for the purpose, referring in so doing to the drawings annexed and the letters of reference marked thereon.

The drawings show the invention as applied to a locomotive-engine.

Figure 2:
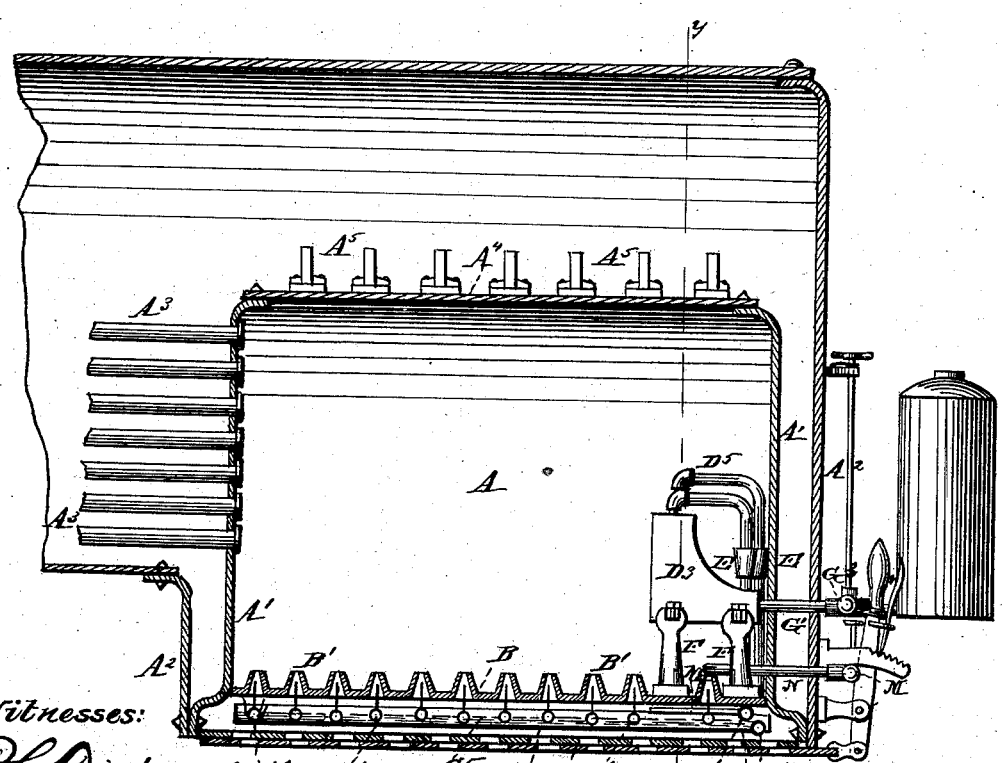
Figure 3:
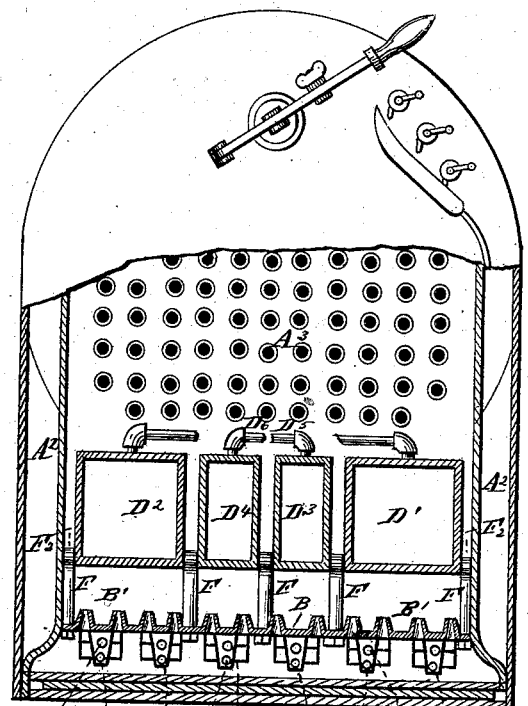
Figure 5:
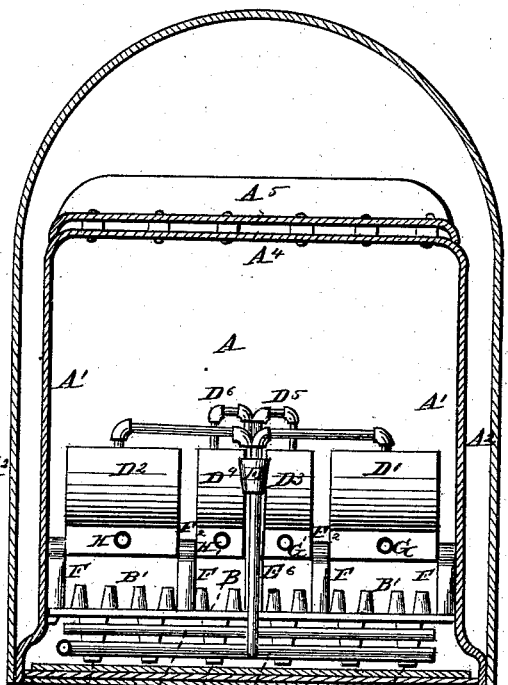
Figure 4:
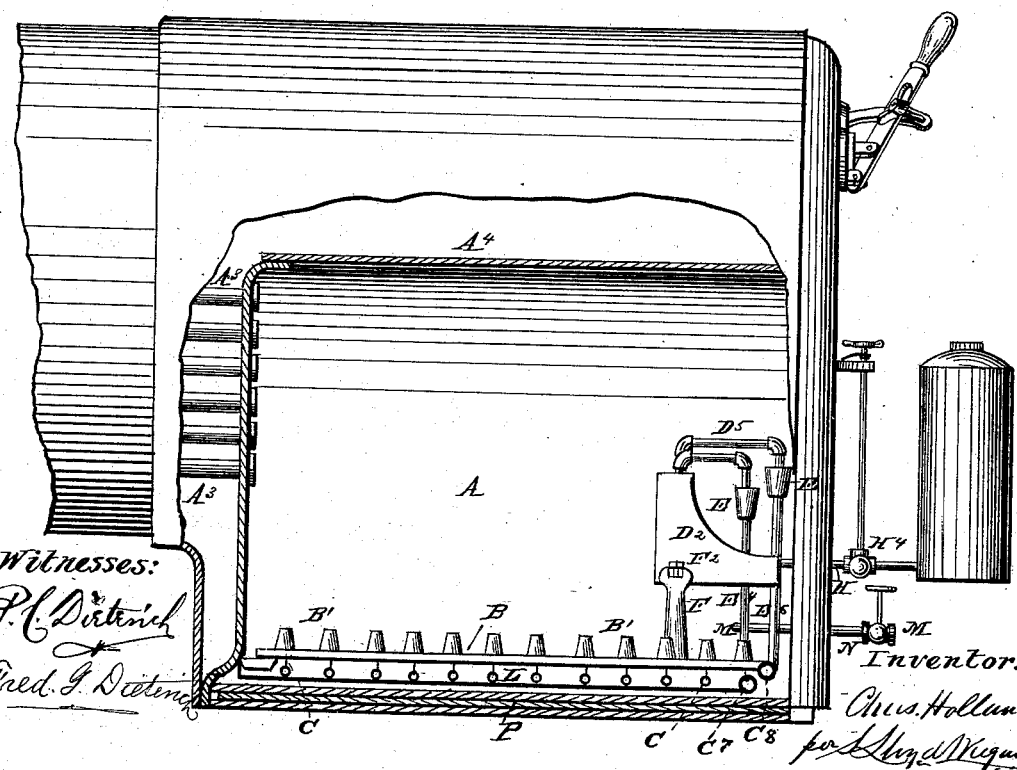
Figure 6:
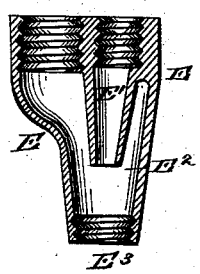
Figure 7:
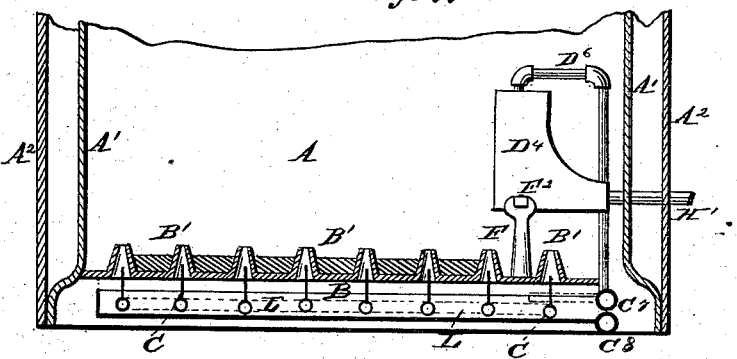
Figure 8:
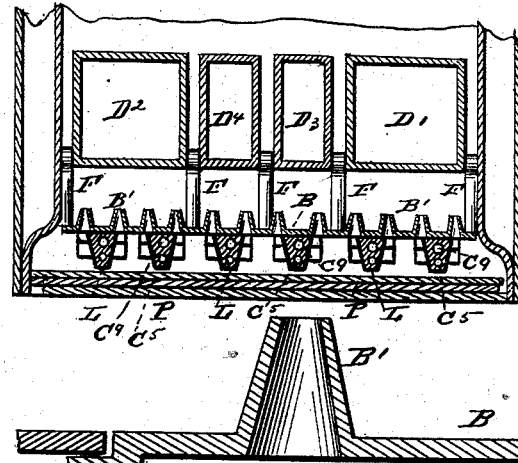
Figure 10:
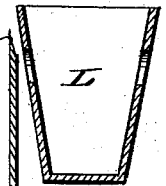
Figure 11:
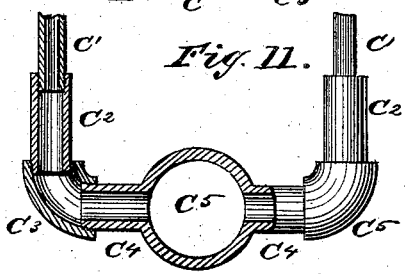
Figure 9:
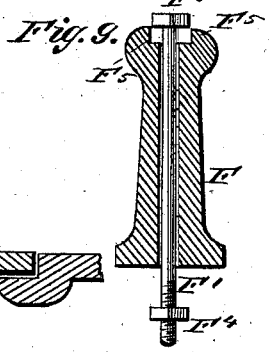
Figure 12:
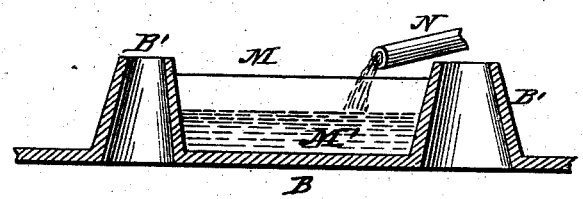
Figure 13:
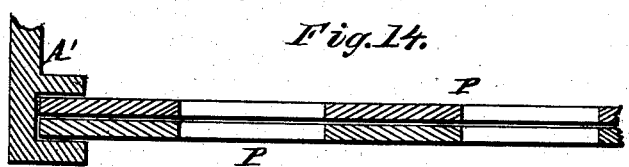
Figures 14, 15:
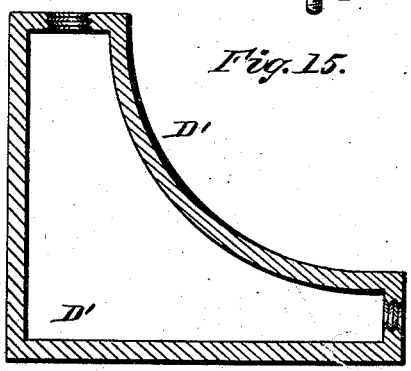
Figure 16:
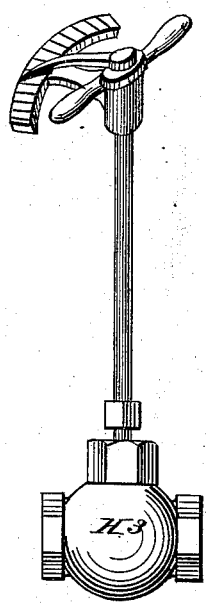

Figure 1 shows a plan with the furnace roof or crown removed; Fig. 2, a sectional elevation in the plane indicated by the dotted line $x\ x$ in Fig. 1; Fig. 3, a partial vertical section, indicated by the dotted line $y\ y$ in Figs. 1 and 2. Fig. 4 shows a side elevation with the side wall of the furnace removed; Fig. 5, a front elevation with the front wall of the furnace removed. Fig. 6 shows the combining-tubes in section on enlarged scale. Figs. 7 and 8 show a modification of the lower part of the furnace, drawn in the same planes of sectional elevation in Figs. 2 and 3. Figs. 9, 10, 11, 12, 13, 14, 15, and 16 show enlarged sections of the parts of the apparatus in detail; and Figs. 17, 18, 19, and 20, modifications in form and application of the entire apparatus.

The same letters of reference apply to the same parts in the several figures.

A represents the furnace or combustion-chamber of a locomotive-boiler; A', the metallic wall of the fire-box; $A^2$, the surrounding water-space; $A^3$, the flues or tubes leading to the chimney; $A^4$, the furnace-crown, and $A^5$ the crown-bars. This portion of the apparatus does not materially differ from that in general use, and any other efficient form of furnace, either for steam-generation or metallurgic or other purpose, may be substituted in making useful applications of this invention.

The floor of the furnace A is composed of plates B, fitting closely to each other, with proper provision to remain close and tight without cramping or distortion from unequal expansion and contraction. In the floor-plates B are formed a series of tubulures or jet-pipes, B', in the form of truncated hollow cones, the smaller ends being upward. The function of these conical tubes $B'$ is to admit the vaporous, gaseous, or aeriform fuel and the air with which the said fuel is burned, and to heat such air as it passes upward or inward to the combustion-chamber. The jet-tubes $B'$ are preferably arranged at equal distances in parallel rows, for the better distribution of the gas-jets in the furnace, and also for the more convenient connection of the gas supplying and distributing tubes, as will hereinafter appear.

Centrally located in each of the tubulures $B'$ are jet-tubes C, made preferably of pipes $C'$, having small central conical apertures, and inserted in pillars or tubes $C^2$, fitted gas-tight in elbows $C^3$, attached by tubes $C^4$ branching laterally from pipes $C^5$. The pipes $C^5$ are hermetically closed at the ends $C^6$, and at the opposite ends are inserted gas-tight into the pipes $C^7$ and $C^8$. The pipes $C^5$ are arranged horizontally beneath the floor-plates B, in parallel position with each other, between alternate lines of tubulures $B'$, so that each pipe $C^5$ supplies the lines of branches and jet-tubes C upon both sides thereof. The lower pipe, $C^8$, is larger than the upper pipe, $C^7$, and supplies the fuel to the pipes $C^5$ under the four outer floor-plates, B, while the upper pipe, $C^7$, supplies only the two pipes $C^5$ under the central pair of plates, B, and the short pipes $C^9$ under the ends of the four outer plates, B, toward the right hand in Figs. 1 and 2. The short pipes $C^9$ are placed above the pipes $C^5$ under the outer plates, B, and supply, by branches $C^4$, jet-tubes C, extending upward into the tube $B'$ under the retorts or generators $D'$ $D^2$. The tubes $C^9$ are closed at their ends farthest from the pipe $C^7$.

$D'$ and $D^2$ are retorts or generating-vessels placed a little distance above the plates B and jet-tubes $B'$, over the outer floor-plate, B, and as close as may be conveniently arranged toward the wall of the furnace. $D^3$ and $D^4$ are smaller retorts or generating-vessels, similarly placed above the jet-tubes $B'$ of the central plate, B.

From the upper part of the central or smaller retorts, $D^3$ and $D^4$, are tubes $D^5$ and $D^6$, which unite in the upper end of a combining-tube, E, (shown in section in Fig. 6,) consisting of one jet-pipe, $E'$, surrounded by another tube, $E^2$, and having in common one delivery or discharge tube, $E^3$. The lower end of the combining-tube E is connected by a suitable tube, $E^4$, to the pipe or tube $C^7$. A similar series of pipes, $D^7$ and $D^8$, connect from the upper part of the retorts $D'$ and $D^2$ to another combining-tube, E, which is connected by a tube, $E^6$, to the pipe $C^8$. The retorts $D'$, $D^2$, $D^3$, and $D^4$ are supported upon pillars F, and held thereon by bolts $F'$, extending through lugs $F^2$, cast on the retort, down through the pillars F and plates B, where they are secured by a suitable nut, $F^4$. The upper ends of the pillars F are formed with jaws $F^5$, for the purpose of embracing the lugs $F^2$ and better retaining the retorts in position. The pillars F, lugs $F^2$, jaws $F^5$, and bolts $F'$ and nuts $F^4$ should be so fitted and adjusted as to safely retain the retorts in position without resisting the expansion and contraction of the retorts $D'$, $D^2$, $D^3$, and $D^4$.

Into the retorts $D'$ and $D^5$ are fitted pipes G and $G'$, provided with valves $G^2$ and $G^3$, leading from a tank containing water or steam under pressure. These pipes G and $G'$ extend through the furnace-wall $A'$ and water-space $A^2$, and serve to admit water or steam into the retorts $D'$ and $D^5$. Similar pipes H and $H'$, also extending through the furnace-wall $A'$ and water-space $A^2$, and provided with suitable valves or stops, $H^3$ and $H^4$, connect the retorts $D^2$ and $D^4$ with a vessel, K, containing liquid hydrocarbon or oil under pressure, and serve to introduce in regulable quantities a supply of such fluids to the retorts $D^2$ and $D^4$.

Under each of the tubes $C^5$ is placed a trough, L, having perforations in the sides, through which the branches $C^4$ extend. The functions of the troughs L are to avoid or intercept currents of air from cooling the pipes $C^5$ and to retard radiation of heat from the said pipes $C^5$, and they may be filled, for the more effectual retention of heat, with a non-conducting or slow-conducting substance, as shown in Figs. 7 and 8. The spaces between the jet-tubes or tubulures $B'$ in the floor-plates B may be similarly covered with non-conducting material, as shown in Figs. 7 and 8.

Upon the floor-plates B, at the part under the retort $D^3$, is formed a rim, M, inclosing a small cavity or basin, $M'$, into which a pipe, N, leading from the oil-reservoir, and provided with a suitable cock or valve, $N'$, terminates. A damper, P, or register for closing off the air-supply under the furnace-floor is fitted beneath the troughs L.

The operations of the process with the apparatus are as follows: A lighted match is placed in the cavity $M'$ and a small amount of oil, admitted through the pipe N, is ignited therein, heating the retort $D^3$. At the same time a small supply of water is permitted to flow into the retort $D^3$. Next a small supply of oil is admitted to the retort $D^4$. Steam generated and superheated, issuing from the upper part of the retort $D^3$, passes by the pipe $D^5$ to the combining-tube E, where it commingles or combines with the hydrocarbon issuing by the pipe $D^6$ from the upper part of the retort $D^4$, and passes down to the pipe $C^7$, is distributed through the pipes $C^5$, through the jets C, carrying air with it through the tubulures $B'$ in the central floor-plates, B B, and ignited in the furnace at the same time that the gas is delivered and ignited with air entering the tubulures $B'$ of the central plates, B, of the furnace. Gas enters through the tubes $C^9$, through jets C under the large retorts $D'$ and $D^2$. The ignited gas enters the furnace-chamber with the air through the tubulures $B'$, and heats the floor-plates B, and thus heats the air at its entrance to the furnace-chamber, and very soon heats all of the retorts $D'$ $D^2$ $D^3$ $D^4$ in the furnace. When this takes place oil is admitted to the retort $D^2$ and steam or water to the retort $D'$. As the temperature increases the flame in the furnace, issuing from or entering by the tubulures, from being at first of yellow color and luminous becomes a clear blue or purple and transparent, and the entire furnace-chamber is filled with ignited gases of intense temperature. The issuing products of combustion, after passing through the boiler-flues, are transparent, invisible, and almost inodorous. By means of the valves $G^2$ and $G^3$ and $H^3$ and $H^4$, which, for convenience of manipulation, should have indices and dials or notched sectors for the purpose of showing and holding them in adjustment, the supply of fuel and temperature can be controlled to meet the varying requirements of work.

The combined effect of steam or water passing into and through the retorts and mingling with the products of oil or hydrocarbon distillation, and thence entering into the inclosed combustion-chamber, is with a very small fuel consumption to generate larger volume of heat, of greater intensity, and in a more uniform and reliable manner than is otherwise practicable.

The easy adaptability of this apparatus to any form of furnace affords a degree of latitude in planning boiler and engine constructions not found in other kinds of heat-generating furnaces, and renders them applicable in situations where boilers having furnaces fired in the usual manner are inadmissible. Modifications of this character and of the form and positions of the retorts are shown in Figs. 17, 18, 19, and 20.

Figure 17:
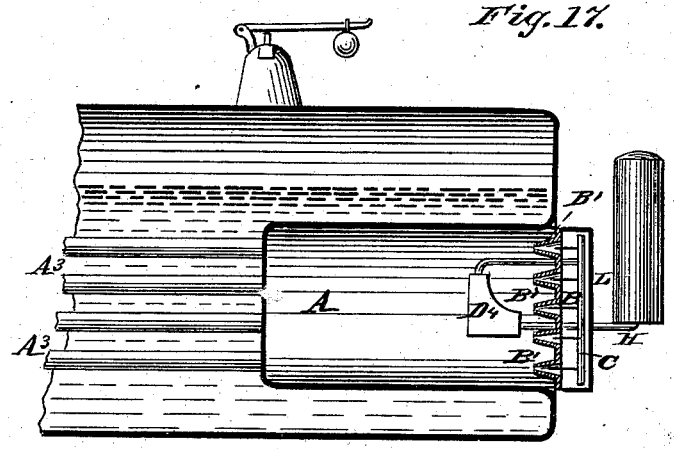
Figure 18:
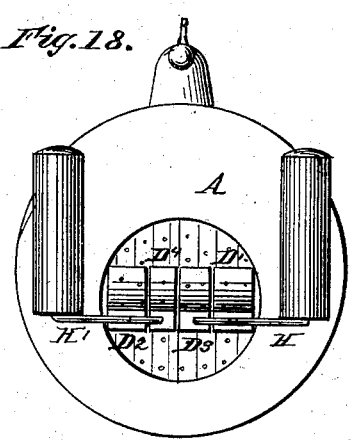
Figure 19:
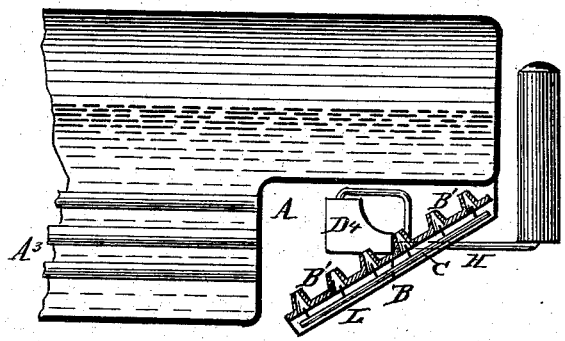
Figure 20:
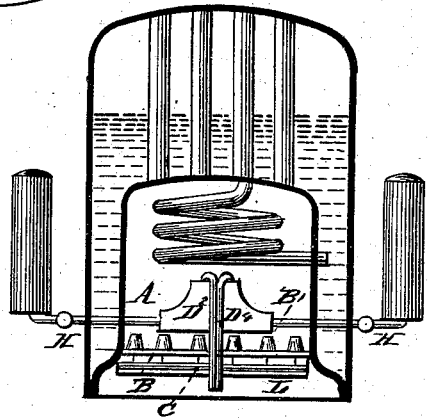

The jets may impinge directly on the heat-absorbing surfaces, as in Figs. 17 and 18, or may be so located as to pass into the flues, as in Fig. 19, or the heat-absorbing surfaces may be augmented by a coil of tube, through which the water of the boiler circulates in the combustion-chamber, as shown in Fig. 20. Such increase of heating-surface does not interfere with the combustion of the fuel as effected by this process and apparatus, as it has been found to do with other forms of furnaces and fuel.

What I claim as my invention is—

1. In an apparatus for burning fluid hydrocarbons with steam and air, the combination of two or more pairs of separate retorts so connected by tubes with a hydrocarbon fluid and water-supply and with jet-tubes from which the resultant gases or vapors and steam are burned that one retort of each pair shall be supplied with water or steam and the other retort of each pair shall be supplied with hydrocarbon fluid, and the gas or vapor and steam generated in the other pair or pairs of retorts shall heat the furnace, substantially as and for the purpose set forth.

2. In an apparatus for burning hydrocarbon fluids with steam and air, the combination of separate retorts, connected in pairs and delivering steam and hydrocarbon gas or vapors into the same pipe, and a series of jet-tubes delivering jets of mixed steam and gas or vapor through conical air-tubes leading into an inclosed combustion-chamber, substantially as and for the purpose set forth.

3. In an apparatus for burning hydrocarbon fluids in combination with steam and air, the combination of jet-tubes delivering jets of mixed steam and gas or vapor in a heated state with distributing-pipes protected by troughs and extending into conical air-tubes leading into an inclosed furnace, constructed and arranged as shown and described.

4. In apparatus for burning hydrocarbon fluid with steam and air, the construction and and form of retorts as shown, and adapted to be arranged in pairs and held in position in a furnace by supporting pillars and lugs, substantially as and for the purpose set forth and described.

5. In combination with a series of separate retorts, arranged in pairs in the manner set forth, for the burning of hydrocarbon fluid with steam and air, a priming or starting pan located under one of the retorts of the pair of retorts supplying the heating-jets to the retorts, substantially as shown and described.

CHARLES HOLLAND.

Witnesses:
  JOS. L. GREENWALD,
  J. DANIEL EBY.